(12) United States Patent
Goetting et al.

(10) Patent No.: US 11,349,421 B2
(45) Date of Patent: May 31, 2022

(54) METHOD AND DEVICE FOR DETERMINING THE POSITION AND THE ROTATIONAL SPEED OF A ROTOR OF AN ELECTRIC MACHINE

(71) Applicant: Robert Bosch GmbH, Stuttgart (DE)

(72) Inventors: Gunther Goetting, Stuttgart (DE); Lei Chen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/256,717

(22) PCT Filed: Jun. 5, 2019

(86) PCT No.: PCT/EP2019/064573
§ 371 (c)(1),
(2) Date: Dec. 29, 2020

(87) PCT Pub. No.: WO2020/001945
PCT Pub. Date: Jan. 2, 2020

(65) Prior Publication Data
US 2021/0257945 A1 Aug. 19, 2021

(30) Foreign Application Priority Data
Jun. 29, 2018 (DE) .................... 10 2018 210 668.1

(51) Int. Cl.
*G01P 3/44* (2006.01)
*H02P 21/18* (2016.01)
(Continued)

(52) U.S. Cl.
CPC ............ *H02P 21/18* (2016.02); *B60L 3/0061* (2013.01); *H02P 3/22* (2013.01); *H02P 21/12* (2013.01);
(Continued)

(58) Field of Classification Search
CPC ......... H02P 21/18; H02P 21/12; B60L 3/0061; G01P 3/44
See application file for complete search history.

(56) References Cited

U.S. PATENT DOCUMENTS 6,979,975 B1* 12/2005 Kinpara ............... G01P 3/44
318/400.02
2016/0329849 A1* 11/2016 Nakajima ............. H02P 6/16

FOREIGN PATENT DOCUMENTS

DE 102013112169 A1 5/2015
DE 102016210238 A1 12/2017
(Continued)

OTHER PUBLICATIONS

Translation of International Search Report for Application No. PCT/EP2019/064573 dated Jul. 30, 2019 (2 pages).

*Primary Examiner* — Cortez M Cook
(74) *Attorney, Agent, or Firm* — Michael Best & Friedrich LLP

(57) ABSTRACT

The invention relates to a method for determining the position ($\Theta_R$) and the rotational speed ($n_R$) of a rotor of an electrical machine during an active short circuit and a rotor-state determining device (10) designed to carry out the method. The method comprises the steps of determining the short circuit currents ($I_u$, $I_v$, $I_w$) resulting during the short circuit, determining a total current ($I_\alpha$, $I_\beta$) resulting from the short circuit currents ($I_u$, $I_v$, $I_w$), determining a stator current angle ($\psi_I$) of the total current ($I_\alpha$, $I_\beta$) with respect to a stator coordinate system ($\alpha$, $\beta$), determining a rotor current angle ($\varphi_I$) of the total current ($I_\alpha$, $I_\beta$) with respect to a flux direction ($d_R$) of the rotor, this step comprising the steps of calculating an amount variable (I) of the total current ($I_\alpha$, $I_\beta$), determining the rotor current angle ($\varphi_I$) on the basis of a characteristic dependence between the amount variable (I) and a rotor current angle ($\varphi_I$), which dependence is created (Continued)

for the electrical machine, the rotor position ($\Theta_R$) corresponding to a sum of the stator current angle ($\psi_I$) and the rotor current angle ($\varphi_I$), and the rotor rotational speed ($n_R$) resulting from monitoring of the rotor position ($\Theta_R$).

7 Claims, 3 Drawing Sheets

(51) Int. Cl.
    *H02P 29/032*      (2016.01)
    *B60L 3/00*      (2019.01)
    *H02P 3/22*      (2006.01)
    *H02P 21/12*      (2016.01)
    *H02P 29/028*      (2016.01)

(52) U.S. Cl.
    CPC .......... *H02P 29/028* (2013.01); *H02P 29/032* (2016.02)

(56) References Cited

FOREIGN PATENT DOCUMENTS

EP      1195611 A1    4/2002
WO     2016066330 A1    5/2016

\* cited by examiner

METHOD AND DEVICE FOR DETERMINING THE POSITION AND THE ROTATIONAL SPEED OF A ROTOR OF AN ELECTRIC MACHINE

BACKGROUND OF THE INVENTION

The present invention relates to a method for determining a position and rotational speed of a rotor of an electric machine during an active short circuit.

Electric machines such as, for example, permanently excited synchronous machines, are used in numerous technical areas. For example, such permanently excited synchronous machines are used in motor vehicles, in particular electric vehicles and hybrid vehicles.

WO 2016/066330 discloses a method and a device for switching from the open-circuit operating state of an electric machine into a short-circuit operating state.

The background of the invention is that in the event of a failure of the rotor position sensors at a rotational speed of the rotor within an emergency operation rotational speed range, the electric machine switches into the emergency operating mode. In order to avoid damage to the electric machine, automatic switching into an active short circuit occurs above an emergency operation rotational speed. However, this makes it impossible to operate the electric machine in an emergency operating mode.

SUMMARY OF THE INVENTION

Therefore the object of the present invention is to make available a method and a device with which in the event of a failure of rotor position sensors, the position and the rotational speed of the rotor of an electric machine can be determined during an active short circuit so that a safe transition into the emergency operating mode is possible.

The object is achieved by means of a method for determining a position and rotational speed of a rotor of an electric machine during an active short circuit.

The method according to the invention comprises the steps of determining the short circuit currents occurring during the short circuit, determining a total current arising from the short circuit currents, determining a stator current angle of the total current with respect to a stator coordinate system, determining a rotor current angle of the total current with respect to a direction of flow of the rotor. The latter comprises here the steps of calculating an absolute-value variable of the total current, determining the rotor current angle on the basis of a characteristic dependence, produced for the electric machine, between the absolute-value total current and a rotor current angle, wherein the rotor position corresponds to a sum of the stator current angle and the rotor current angle, and wherein the rotor rotational speed is obtained from monitoring the rotor position.

The position of the rotor according to the present invention is understood to be the position of the rotor relative to a stator. This position is preferably indicated here as an angle. Accordingly, the rotational speed of the rotor is also to be understood to be a relative movement of the rotor with respect to the stator. The stator current angle or rotor current angle is understood here to be an angle between the stator or rotor and a total current.

The advantage of the invention is that even in the event of failure of the rotor position sensors the position and the rotor rotational speed can be determined. As a result, during the active short circuit the electric machine can be safely changed into an emergency operating mode. When an emergency operation rotational speed is reached, the emergency operating mode can therefore be started without damage occurring to the electric machine.

In one preferred embodiment of the invention, the characteristic dependence is determined by relating to one another the rotational-speed-dependent value of absolute-value total current and of the rotor current angle. This makes it possible to calculate a rotor current angle by determining an absolute-value total current.

In a further preferred embodiment of the invention, a rotor position smoothed value is determined from smoothing a multiplicity of rotor position values. Consequently, inaccuracies as a result of large deviations in individual values can be minimized. Measured value noise is as a result reduced so that the accuracy of the determined rotor position is increased.

The method preferably comprises a step in which the determined rotor position and/or rotor rotational speed are/is compared with the sensor information. This can permit a defect of a sensor to be verified once more.

The invention additionally comprises a rotor state-determining device which is configured to carry out the method according to the invention. The rotor state-determining device comprises here a current-determining unit for determining the short circuit currents which occur during the short circuit, a total current-determining unit for determining a total current which results from the short circuit currents, a stator current angle-determining unit for determining a stator current angle of the total current with respect to a stator coordinate system, a rotor current angle-determining device for determining a rotor current angle of the total current with respect to a direction of flow of the rotor, wherein the rotor current angle-determining device comprises a calculation unit for calculating an absolute-value variable of the total current, and a current angle-correlation unit for determining the rotor current angle which is correlated with the absolute-value total current, a rotor position-determining unit for determining a rotor position, a rotor rotational speed-determining device for determining a rotor rotational speed.

The method according to the invention can be carried out by means of the rotor state-determining device so that the advantages specified with respect to this method can be achieved.

In one preferred embodiment, the rotor rotational speed-determining device comprises a smoothing unit. The method for smoothing the rotor position values can be carried out by means of this smoothing unit, so that the accuracy of the determined rotor position values is increased.

In a further preferred embodiment, the electric machine is a permanent magnetic synchronous machine, an electrically excited synchronous machine or a synchronous reluctance machine. The permanent magnet synchronous machine has the advantage that it has a high level of efficiency and a small design. The synchronous reluctance machine has the advantage that in contrast with permanent magnet-excited synchronous motors no magnetic materials based on so-called rare earth materials are used in its manufacture. Also, virtually no losses occur in the rotor of a synchronous reluctance machine, and as result it has a good level of efficiency.

The electric machine preferably has three phases. The advantage of such electric machines is that they have high dynamics, a high torque and high efficiency.

In order to carry out the method according to the invention, the invention comprises a computer program product having program code means for carrying out the method when the computer program product is stored on a control unit of a rotor-state-determining device or on a computer-readable data carrier. Moreover, the invention comprises a machine-readable storage medium in which the computer program product is stored.

BRIEF DESCRIPTION OF THE DRAWINGS

Exemplary embodiments of the invention are illustrated in the drawing and explained in more detail in the following description. In the drawing.

DETAILED DESCRIPTION

Figure 1:
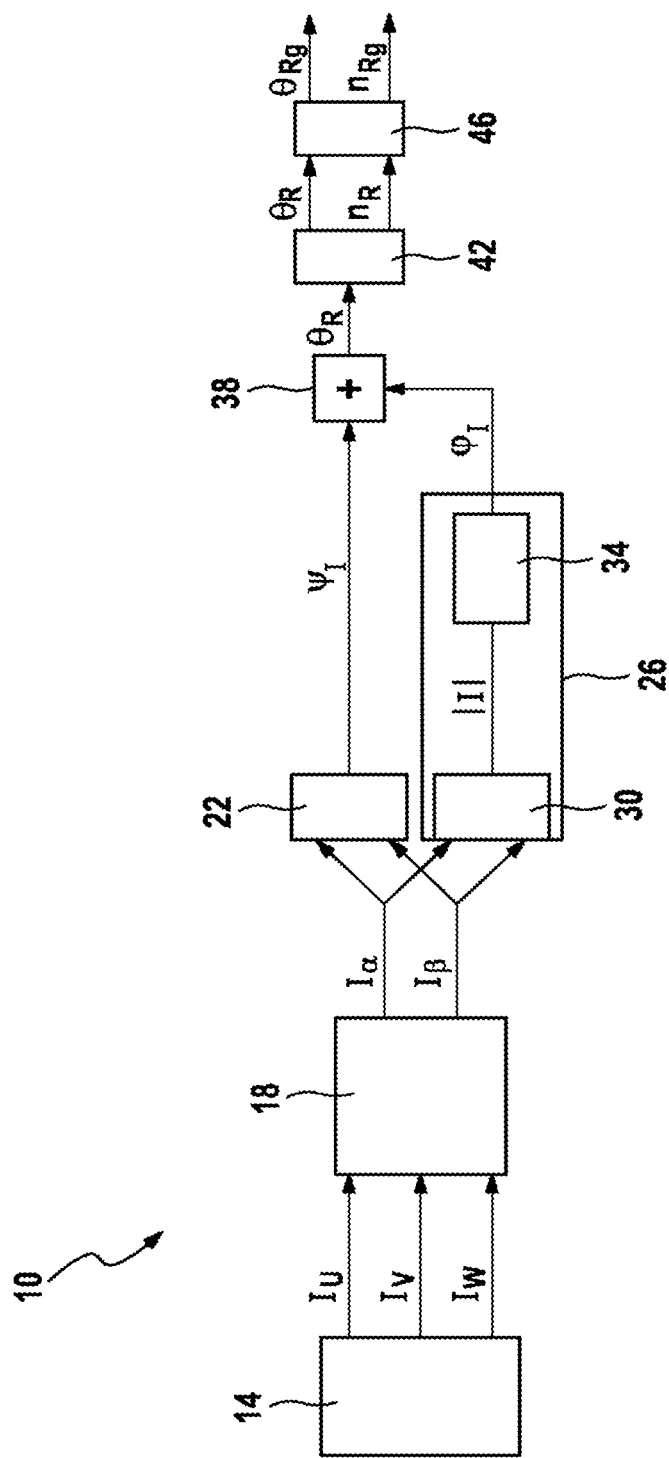
FIG. 1 shows an exemplary embodiment of a method and of a rotor state-determining device for determining a position and rotational speed of a rotor of an electric machine.
Figure 2:
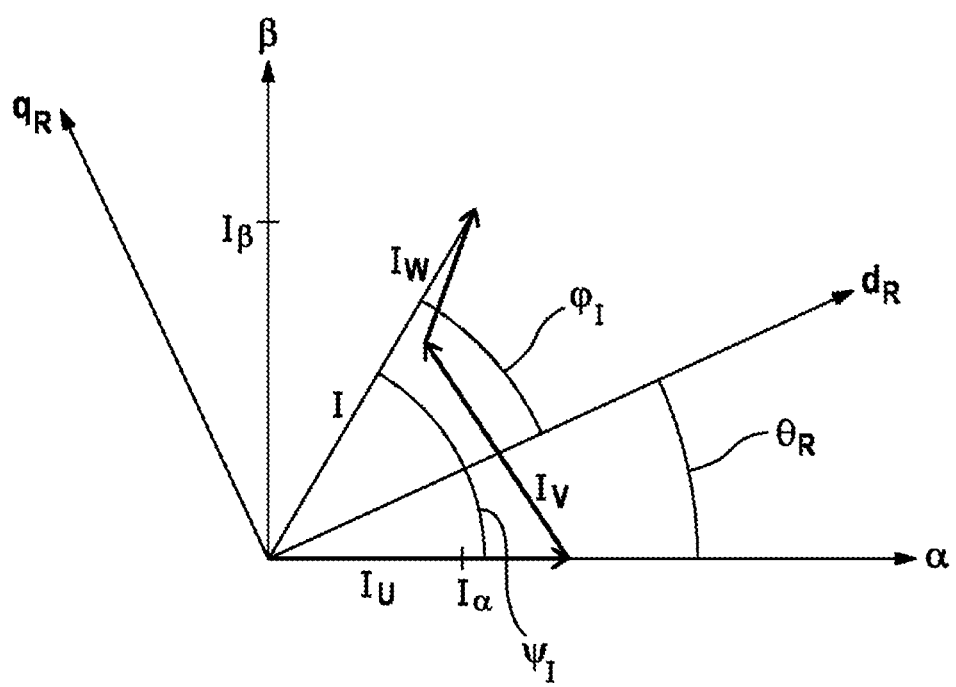
FIG. 2 shows a graphic illustration of a position determination process of a rotor with respect to a stator using the example of a three-phase electric machine.

FIG. 1 shows an exemplary embodiment of a method and an exemplary embodiment of a rotor state-determining device 10 for determining a position OR and rotational speed $n_R$ of a rotor (not shown) of an electric machine (not shown). For this purpose, the short circuit currents $I_U$, $I_V$, $I_W$ occurring during an active short circuit are determined in a current-determining unit 14, using the example of a three-phase electric machine. The resulting short circuit currents $I_U$, $I_V$, $I_W$ are illustrated in FIG. 2. A total current $I_\alpha$, $I_\beta$ arising from the short circuit currents $I_U$, $I_V$, $I_W$ is then determined in a total current-determining unit 18 of the rotor state-determining device 10. A graphic determination of the total current $I_\alpha$, $I_\beta$ from the short circuit currents $I_U$, $I_V$, $I_W$ which are offset by 120° for a three-phase motor is illustrated in FIG. 2.

A stator current angle-determining unit 22 determines an angle, denoted as a stator current angle $\psi_I$ and shown in FIG. 2, of the total current $I_\alpha$, $I_\beta$ with respect to a stator coordinate system $\alpha$, $\beta$. A direction of flow of the total current $I_\alpha$, $I_\beta$ with respect to the stator coordinate system $\alpha$, $\beta$ is indicated by means of the stator current angle $\psi_I$. The rotor state-determining device 10 additionally comprises a rotor current angle-determining device 26 which comprises a calculation unit 30 in which an absolute-value variable I of the total current $I_\alpha$, $I_\beta$ is calculated.

Moreover, the rotor current angle-determining device 26 comprises a current angle-correlation unit 34 which determines a rotor current angle $\varphi_I$ on the basis of a characteristic dependence, produced for the electric machine, between the absolute-value total current I determined by the calculation unit 30 and a rotor current angle $\varphi_I$.

As shown in FIG. 2, the rotor current angle $\varphi_I$ indicates the angle between the total current $I_\alpha$, $I_\beta$ and the direction of flow $d_R$ of the rotor. The rotor state-determining device 10 additionally comprises a rotor position-determining unit 38 which calculates the rotor position $\Theta_R$ from a sum of the stator current angle $\psi_I$ and rotor current angle $\varphi_I$. The rotor position $\Theta_R$ corresponds, as shown in FIG. 2, to the angle between the direction of flow $d_R$ of the rotor with respect to the stator. The rotor rotational speed $n_R$ is determined by means of a rotor rotational speed-determining device 42, by monitoring the rotor position $\Theta_R$.

A rotor position smoothed value $\Theta_{Rg}$ and rotor rotational speed smoothed value $n_{Rg}$ are calculated from a multiplicity of rotor position values $\Theta_R$ and rotor rotational speed values $n_R$ in a smoothing unit 46. Consequently, inaccuracies as a result of large deviations in individual values can be minimized.

Figure 3:
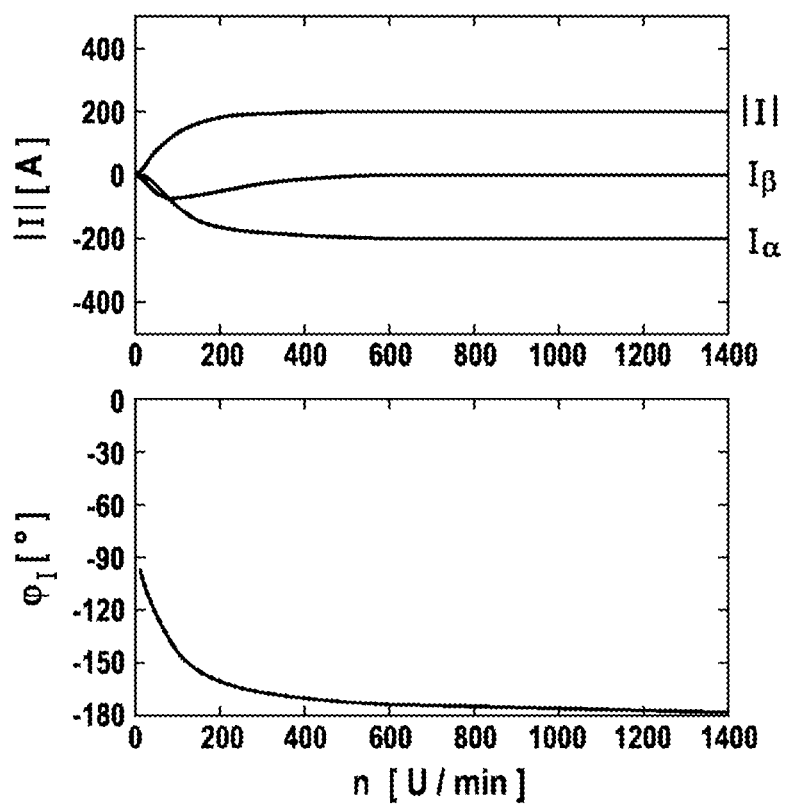
FIG. 3 shows diagrams relating to the derivation of a characteristic dependence between the absolute-value total current and a rotor current angle.

FIG. 3 shows diagrams relating to the derivation of a characteristic dependence between the absolute-value total current I and a rotor current angle $\varphi_I$. For this purpose, the absolute-value total current I determined from the total current $I_\alpha$, $I_\beta$ and the rotor current angle $\varphi_I$ have been respectively determined for an electric machine as a function of the machine rotational speed n. These rotational-speed-dependent values which are determined in the process are different for each electric machine and characterize said machine.

Figure 4:
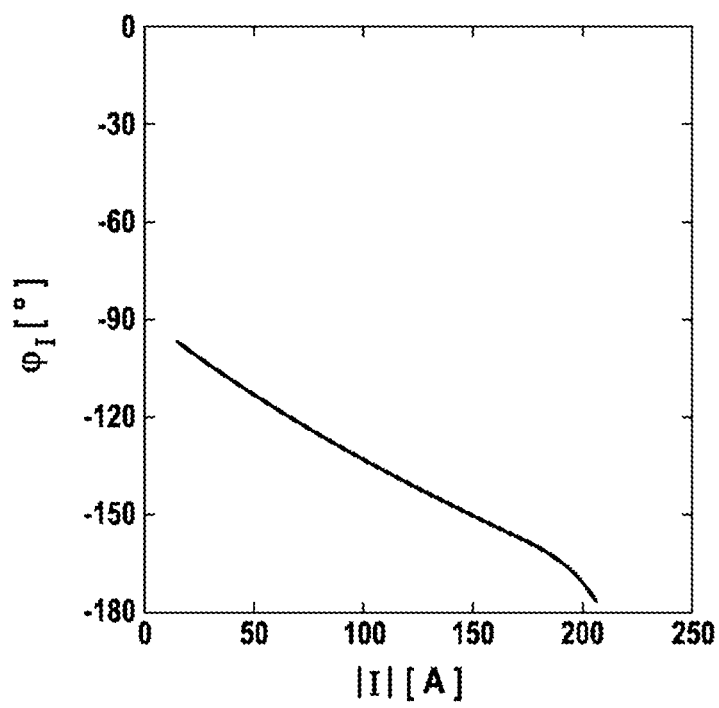
FIG. 4 shows a diagram of the characteristic dependence between the absolute-value total current and a rotor current angle.

The absolute-value total current I and the rotor current angle (pi can be related to one another by means of the same machine rotational speed values n without a rotational speed being known. Such a relationship between the two values is shown in FIG. 4. In this figure, the characteristic dependence between the absolute-value total current I and the rotor current angle $\varphi_I$ is shown. By means of this diagram, the current angle-correlation unit 34 determines, on the basis of the absolute-value total current I, the rotor current angle $\varphi_I$ associated therewith.

The invention claimed is:

1. A computer-implemented method for determining a position ($\Theta_R$) and rotational speed ($n_R$) of a rotor of an electric machine during an active short circuit, wherein the method comprises:
    determining the short circuit currents ($I_U$, $I_V$, $I_W$) occurring during the short circuit,
    determining a total current ($I_\alpha$, $I_\beta$) arising from the short circuit currents ($I_U$, $I_V$, $I_W$),
    determining a stator current angle ($\psi_I$) of the total current ($I_\alpha$, $I_\beta$) with respect to a stator coordinate system ($\alpha$, $\beta$),
    determining a rotor current angle ($\varphi_I$) of the total current ($I_\alpha$, $I_\beta$) with respect to a direction of flow ($d_R$) of the rotor by:
        calculating an absolute-value variable (I) of the total current ($I_\alpha$, $I_\beta$)
    determining the rotor current angle ($\varphi_I$) on the basis of a characteristic dependence, produced for the electric machine, between the absolute-value total current (I) and a rotor current angle ($\varphi_I$),
    wherein the rotor position ($\Theta_R$) corresponds to a sum of the stator current angle ($\psi_I$) and the rotor current angle ($\varphi_I$), and wherein the rotor rotational speed ($n_R$) is obtained from monitoring the rotor position ($\Theta_R$), and wherein a rotor position smoothed value ($\Theta_{Rg}$) is determined from smoothing a multiplicity of rotor position values ($\Theta_R$).

2. The method for determining a position ($\Theta_R$) and rotational speed ($n_R$) of a rotor of an electric machine as claimed in claim 1, wherein the characteristic dependence is determined by relating to one another the rotational-speed-dependent value of absolute-value total current (I) and of the rotor current angle ($\varphi_I$).

3. The method for determining a position ($\Theta_R$) and rotational speed ($n_R$) of a rotor of an electric machine as claimed in claim 1, wherein the method comprises a step in which the determined rotor position ($\Theta_R$) and/or rotor rotational speed ($n_R$) are/is compared with the sensor information.

4. A rotor state-determining device (10) comprising:
a current-determining unit (14) for determining the short circuit currents ($I_U$, $I_V$, $I_W$) which occur during the short circuit,
a total current-determining unit (18) for determining a total current ($I_\alpha$, $I_\beta$) which results from the short circuit currents ($I_U$, $I_V$, $I_W$),
a stator current angle-determining unit (22) for determining a stator current angle ($\psi_I$) of the total current ($I_\alpha$, $I_\beta$) with respect to a stator coordinate system ($\alpha$, $\beta$),
a rotor current angle-determining device (26) for determining a rotor current angle ($\varphi_I$) of the total current ($I_\alpha$, $I_\beta$) with respect to a direction of flow ($d_R$) of the rotor, wherein the rotor current angle-determining device (26) comprises
a calculation unit (30) for calculating an absolute-value variable (I) of the total current ($I_\alpha$, $I_\beta$), and
a current angle-correlation unit (34) for determining the rotor current angle ($\varphi_I$) which is correlated with the absolute-value total current (I),
a rotor position-determining unit (38) for determining a rotor position ($\Theta_R$),
a rotor rotational speed-determining device (42) for determining a rotor rotational speed ($n_R$), and
a smoothing unit for determining a rotor position smoothed value ($\Theta_{Rg}$) determined from smoothing a multiplicity of rotor position values ($\Theta_R$).

5. The rotor state-determining device (10) as claimed in claim 4, wherein the electric machine is a permanent magnetic synchronous machine, an electrically excited synchronous machine or a synchronous reluctance machine.

6. The rotor state-determining device (10) as claimed in claim 4, wherein the electric machine has three phases.

7. A non-transitory, computer-readable medium containing instructions that when executed by a computer in a control unit (14, 18, 22, 26, 38, 42) of a rotor state-determining device (10) cause the computer to
determine the short circuit currents ($I_U$, $I_V$, $I_W$) occurring during the short circuit,
determine a total current ($I_\alpha$, $I_\beta$) arising from the short circuit currents ($I_U$, $I_V$, $I_W$),
determine a stator current angle ($\psi_I$) of the total current ($I_\alpha$, $I_\beta$) with respect to a stator coordinate system ($\alpha$, $\beta$),
determine a rotor current angle ($\varphi_I$) of the total current ($I_\alpha$, $I_\beta$) with respect to a direction of flow ($d_R$) of the rotor by:
calculate an absolute-value variable (I) of the total current ($I_\alpha$, $I_\beta$),
determine the rotor current angle ($\varphi_I$) on the basis of a characteristic dependence, produced for the electric machine, between the absolute-value total current (I) and a rotor current angle ($\varphi_I$),
wherein the rotor position ($\Theta_R$) corresponds to a sum of the stator current angle ($\psi_I$) and the rotor current angle ($\varphi_I$), and wherein the rotor rotational speed ($n_R$) is obtained from monitoring the rotor position ($\Theta_R$), and wherein a rotor position smoothed value ($\Theta_{Rg}$) is determined from smoothing a multiplicity of rotor position values ($\Theta_R$).

* * * * *